United States Patent

Fedorovich

Patent Number: 6,065,755
Date of Patent: May 23, 2000

[54] SEAL DEVICE

[75] Inventor: George Fedorovich, Nacogdoches, Tex.

[73] Assignee: JM Clipper Corporation, Nacogdoches, Tex.

[21] Appl. No.: 08/923,559

[22] Filed: Sep. 4, 1997

Related U.S. Application Data

[63] Continuation-in-part of application No. 08/725,958, Oct. 7, 1996, Pat. No. 5,735,530, which is a continuation of application No. 08/251,268, May 31, 1994, abandoned, which is a continuation-in-part of application No. 08/064,375, May 21, 1993, Pat. No. 5,316,317.

[51] Int. Cl.[7] .............................. F16J 15/32; F16J 15/447
[52] U.S. Cl. ............................................. 277/421; 277/429
[58] Field of Search ................................... 277/347, 412, 277/421, 430, 350, 351, 418, 419, 420, 429

[56] References Cited

U.S. PATENT DOCUMENTS

| Re. 35,309 | 8/1996 | Matsushima et al. |
|---|---|---|
| 2,995,390 | 8/1961 | Gardner . |
| 3,015,504 | 1/1962 | Fulton et al. . |
| 3,277,797 | 10/1966 | Tyree, Jr. et al. ..................... 92/194 |
| 4,022,479 | 5/1977 | Orlowski . |
| 4,114,902 | 9/1978 | Orlowski . |
| 4,175,752 | 11/1979 | Orlowski . |
| 4,304,409 | 12/1981 | Orlowski . |
| 4,327,922 | 5/1982 | Walther . |
| 4,379,600 | 4/1983 | Muller ................................. 308/187.1 |
| 4,432,557 | 2/1984 | Drucktenhengst . |
| 4,576,383 | 3/1986 | Ballard . |
| 4,596,394 | 6/1986 | Schmitt . |
| 4,667,967 | 5/1987 | Deuring . |
| 4,706,968 | 11/1987 | Orlowski . |
| 4,743,034 | 5/1988 | Kakabaker et al. . |
| 4,848,937 | 7/1989 | Hartman et al. ........................ 384/480 |
| 4,852,890 | 8/1989 | Borowski . |
| 4,890,941 | 1/1990 | Calafell, II et al. .................... 384/480 |
| 4,948,152 | 8/1990 | Kilthau et al. . |
| 4,989,883 | 2/1991 | Orlowski . |
| 5,004,248 | 4/1991 | Messenger et al. . |
| 5,024,451 | 6/1991 | Borowski . |
| 5,028,054 | 7/1991 | Peach . |
| 5,040,804 | 8/1991 | Back . |
| 5,069,461 | 12/1991 | Orlowski . |
| 5,158,304 | 10/1992 | Orlowski . |
| 5,174,583 | 12/1992 | Orlowski . |
| 5,183,269 | 2/1993 | Black et al. . |
| 5,207,291 | 5/1993 | Mezzedimi et al. ................... 184/6.16 |
| 5,211,406 | 5/1993 | Katzensteiner . |
| 5,221,095 | 6/1993 | Orlowski . |
| 5,228,700 | 7/1993 | Biesold et al. . |
| 5,238,166 | 8/1993 | Schwarstein et al. . |
| 5,259,628 | 11/1993 | Nisley . |
| 5,269,536 | 12/1993 | Matsushima et al. . |
| 5,290,047 | 3/1994 | Duffee et al. . |
| 5,299,349 | 4/1994 | Seibig ...................................... 29/447 |
| 5,305,509 | 4/1994 | Yuhara et al. ............................ 29/39 |
| 5,347,189 | 9/1994 | Chuta et al. ............................. 310/90 |
| 5,378,000 | 1/1995 | Orlowski . |
| 5,403,019 | 4/1995 | Marshall . |
| 5,456,476 | 10/1995 | Premiski et al. . |
| 5,478,090 | 12/1995 | Simmons et al. . |
| 5,498,006 | 3/1996 | Orlowski . |
| 5,522,601 | 6/1996 | Murphy . |
| 5,636,848 | 6/1997 | Hager et al. . |

Primary Examiner—Anthony Knight
Assistant Examiner—John L. Beres
Attorney, Agent, or Firm—Dickstein Shapiro Morin & Oshinsky LLP

[57] ABSTRACT

A two-piece interlocked labyrinth seal device for providing a seal between a housing and a shaft formed of two ring members connected to each other by outwardly deforming a connecting portion of the radially inwardly positioned member. The inwardly positioned member further includes a plurality of slingers to assist in slinging fluid out of the seal device and back into the housing. The system can be accurately assembled, with the ring members located very close to each other. The system has improved oil retention and water exclusion properties.

27 Claims, 5 Drawing Sheets

SEAL DEVICE

This is a continuation-in-part of U.S. patent application Ser. No. 08/725,958, filed Oct. 7, 1996, now U. S. Pat. No. 5,735,530, which is a continuation of U.S. patent application Ser. No. 08/251,268, filed May 31, 1994, now abandoned, which is a continuation-in-part of U.S. patent application Ser. No. 08/064,375, filed May 21, 1993, now U.S. Pat. No. 5,316,317 the entire disclosure of which is incorporated herein by reference.

BACKGROUND OF THE INVENTION

The present invention relates to a device for providing a seal between a shaft and a housing. In particular, the present invention relates to a dynamic, non-contact labyrinth seal device for preventing lubricant from leaking out of a housing and/or for preventing contaminants from traveling into the housing. The present invention also relates to a labyrinth seal device capable of functioning in high temperature environments. The present invention also relates to a method of assembling a sealed system.

Prior art devices for sealing a rotating shaft are disclosed in U.S. Pat. Nos. 4,022,479 (Orlowski) and 5,024,451 (Borowski). Seal devices of this type may be used to prevent lubricant from escaping out of a bearing housing and/or to prevent contaminants from working their way into the housing. The prior art devices are formed of at least two ring-shaped members that rotate with respect to each other when the shaft is rotated. One of the members is fixed to the housing and does not rotate. The other member rotates with the rotating shaft.

The two ring members should be located very close together, particularly when the seal device is used to isolate the bearing from small particulate contaminants. Even small quantities of such contaminants are capable of significantly deteriorating the bearing. To prevent such contamination, the two relatively rotatable ring members must be held together very closely, with only a very narrow space therebetween.

The ring members of the Orlowski seal device are connected together by a separate securing means, not shown in the prior art patent. The ring members themselves have no means for establishing and maintaining a narrow spacing therebetween. Therefore, the prior art seal device cannot be manufactured as a unit with a preset, fixed spacing. The spacing between the ring members has to be set when the seal device is installed into the housing. This leaves room for human error outside the control of the device manufacturer. In particular, the Orlowski device can be improperly installed, with the ring members located too far apart to perform satisfactorily. Another problem with the Orlowski device is that the ring members may be separated subsequent to installation, for example by high pressure cleaning spray.

The ring members of the Borowski device are held together by a bead and a groove provided on the ring members themselves. The bead fits within the groove with an interference fit. This arrangement is an improvement over the Orlowski system in the sense that no separate securing means is needed. But the Borowski device is still unsatisfactory because the bead must be resiliently deformed to be positioned within the groove, and the groove must be correspondingly enlarged to receive the deformed bead. The deformation of the bead during assembly makes it difficult to achieve the desired close positioning between the two ring members, as explained in more detail below. Further, the Borowski device, which incorporates three members, is unsatisfactory for having a greater number of potential leakage paths than seal devices utilizing only two members.

Prior art devices do not disclose labyrinth seals which are capable of operating in high temperature environments, such as during fires. Conventional seal devices composed of TEFLON® or other similar material, when exposed to high temperatures, may warp, deform or melt, causing a failure in the device to dynamically seal.

SUMMARY OF THE INVENTION

The disadvantages of the prior art are alleviated to a great extent by the present invention which provides a seal device including a rotor and a stator having connecting portions, with the connecting portion of the rotor being located radially inside of the connecting portion of the stator.

In a preferred embodiment of the present invention, the connecting portion of the rotor is deformed to be connected to the connecting portion of the stator.

In one aspect of the present invention, the stator and the rotor are formed of metal. In another aspect of the invention, the stator and rotor form a dynamic seal made of a combination of metallic and non-metallic materials.

In another preferred embodiment, the rotor includes a plurality of slingers, facing outwardly for assisting in transmitting oil or other lubricant back into the housing of the machine utilizing the dynamic seal.

An object of the invention is to provide a two-piece interlocked non-contact labyrinth seal. Forming the seal of only two pieces is advantageous. A two piece seal may have fewer leakage paths than a three piece seal. Moreover, a two piece seal may be more economical to manufacture and more reliable.

Another object of the present invention is to provide a seal device that can be accurately assembled, with very little play.

Another object of the present invention is to provide a seal device which can retain its dynamic sealing characteristics even during extremely high temperatures, such as those temperatures experienced in a fire.

Another object of the invention is to provide a high performance seal device that can be produced economically.

Another object of the present invention is to provide an improved method of assembling a seal device.

Yet another object of the invention is to provide a seal device that is especially well adapted for use in a grease environment.

Other objects and advantages of the present invention will become apparent from the following description and drawings which illustrate preferred embodiments of the present invention.

DETAILED DESCRIPTION OF PREFERRED EMBODIMENTS

Figure 1:
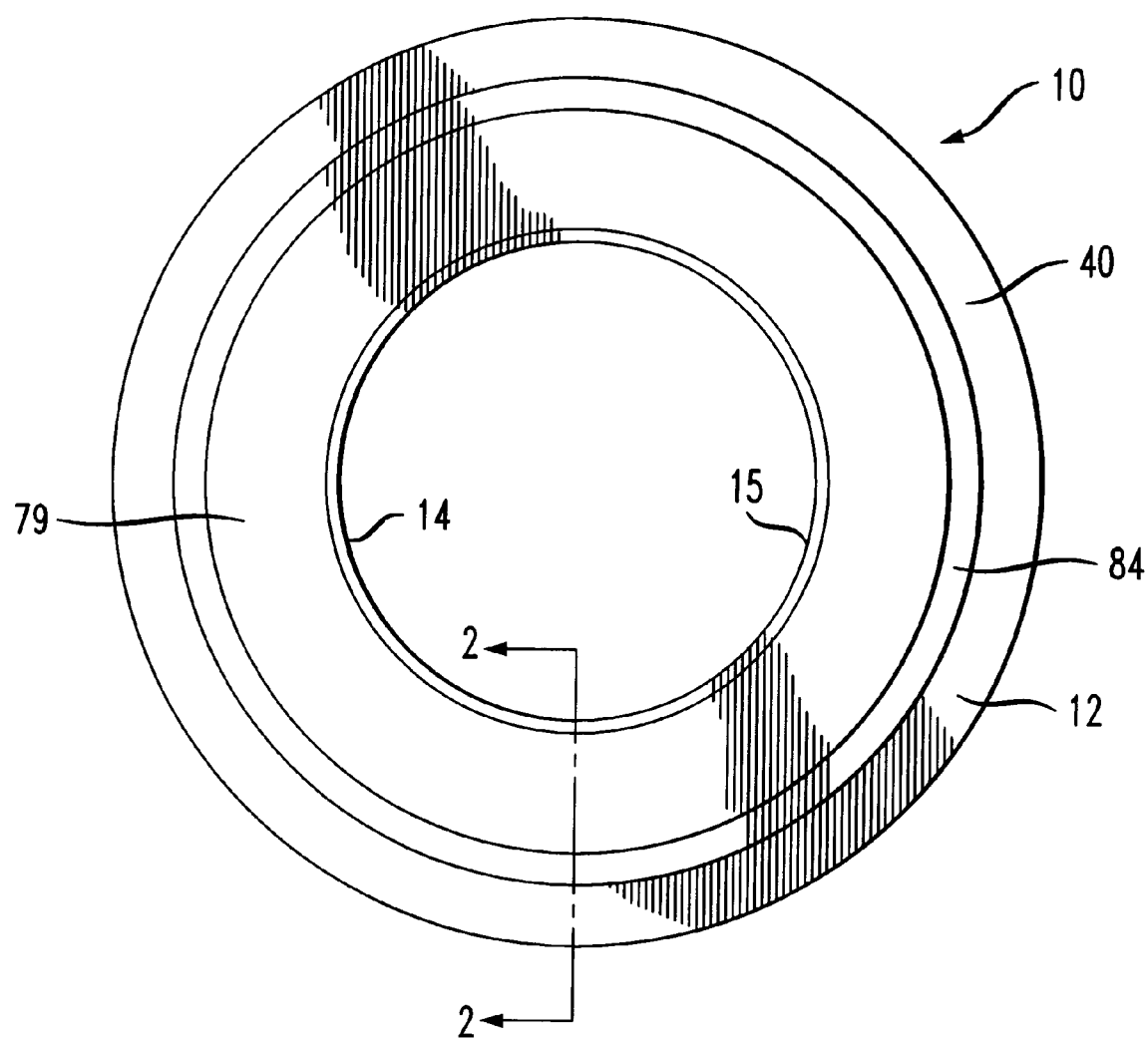
FIG. 1 is a front elevational view of a seal device constructed in accordance with the present invention.
Figure 2:
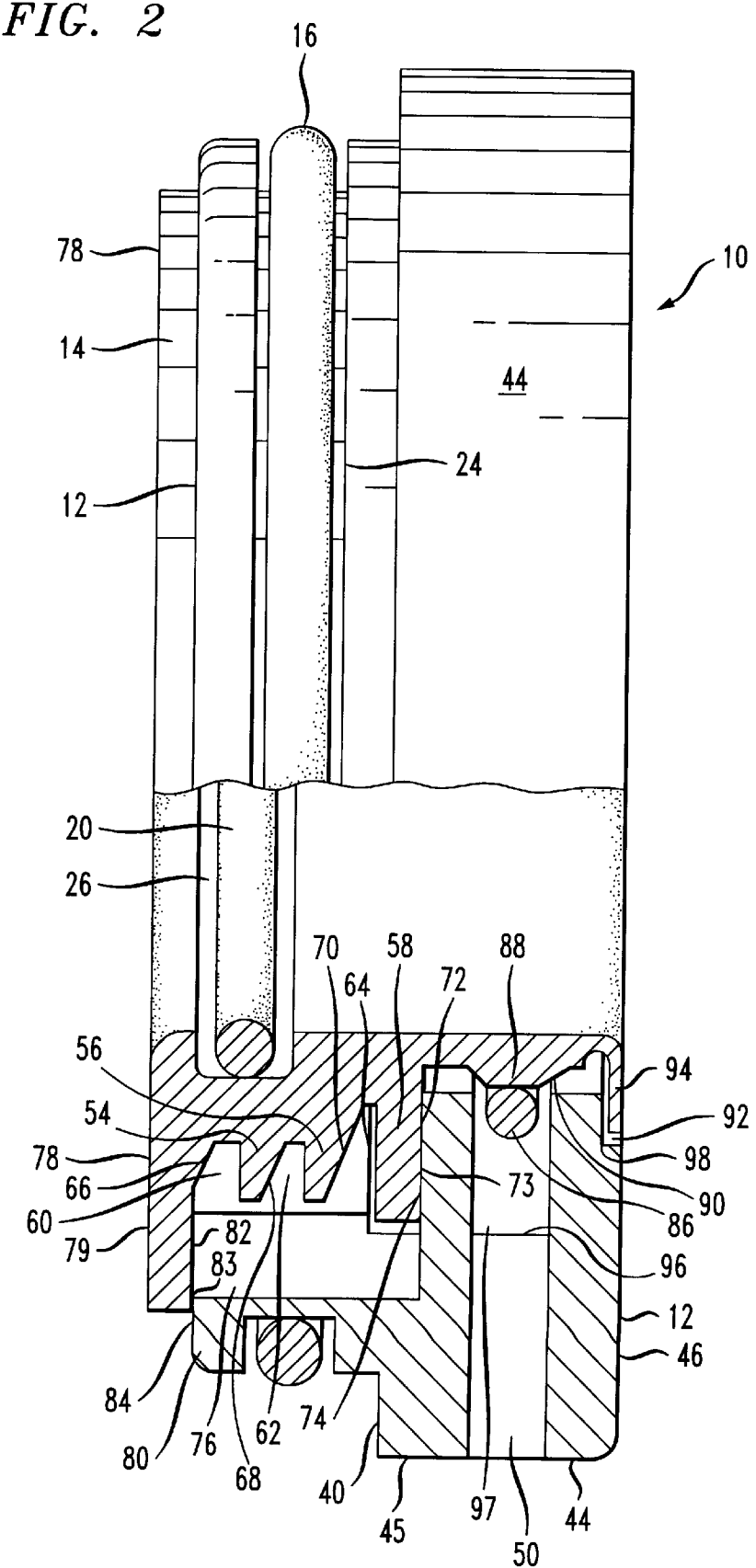
FIG. 2 is a partial cross sectional side view of the seal device of FIG. 1, taken along line 2—2 of FIG. 1.
Figure 3:
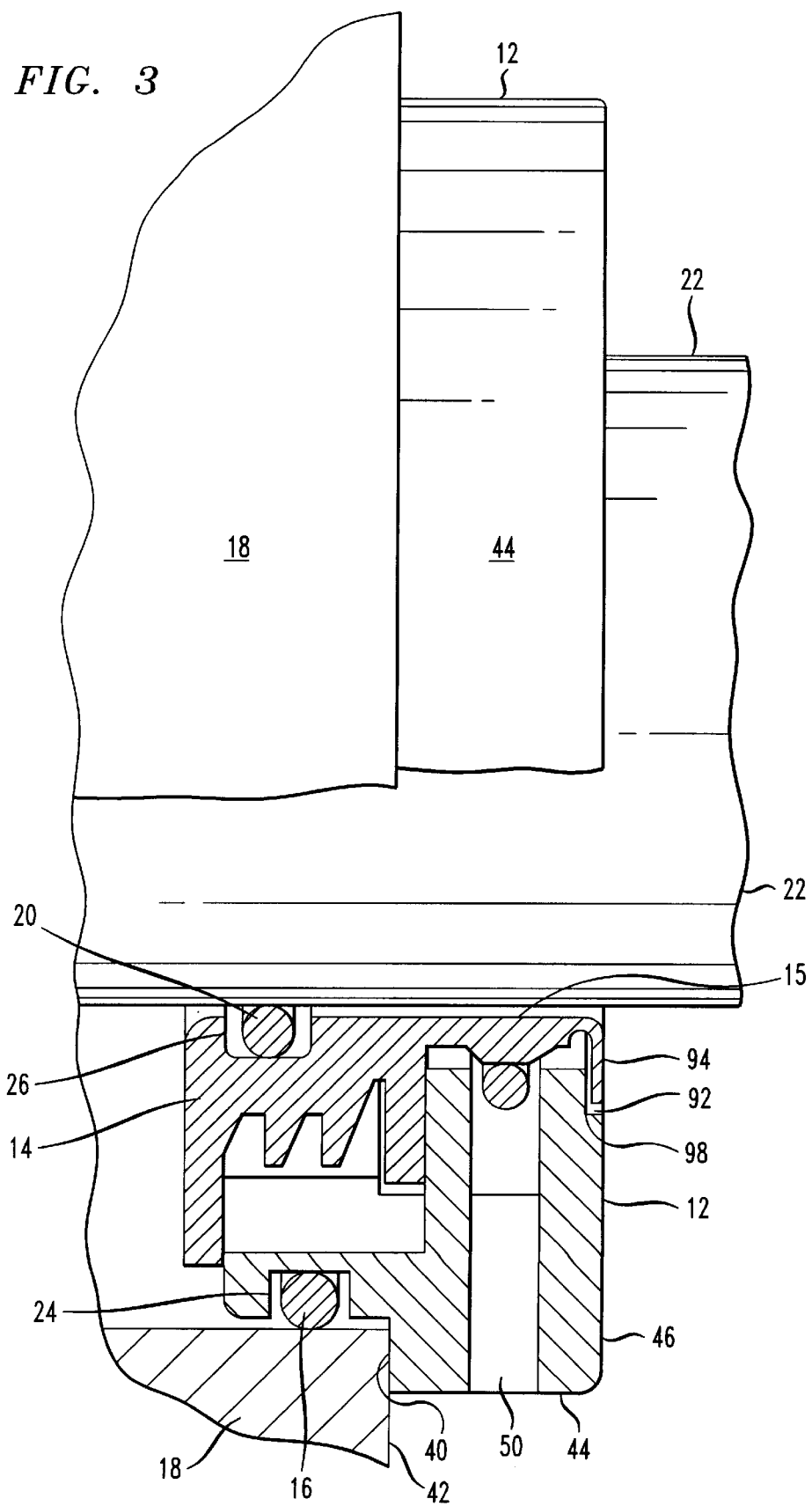
FIG. 3. is a partial cross sectional side view like FIG. 2, but showing the seal device employed within a sealed system.

Referring now to the drawings, wherein like reference numerals indicate like elements, there is shown in FIGS. 1–3 a ring-shaped seal device 10 constructed in accordance with a preferred embodiment of the present invention. The seal device 10 includes a stator member (or stator) 12 and a rotor member (or rotor) 14, seen best in FIG. 2. The rotor 14 has an inner wall 15 which faces a rotating shaft 22 (FIG. 3). An O-ring 16 is provided between the stator 12 and a housing 18, and an O-ring 20 is provided between the rotor 14 and the shaft 22.

The ring-shaped stator and rotor 12, 14 may be made of a suitable high temperature material. In a preferred embodiment of the invention, the stator and rotor 12, 14 may be made of a metallic substance, most preferably bronze. Alternatively, the stator and rotor 12, 14 may be formed of a composite material, stainless steel, carbide, ceramics, or other material capable of withstanding high temperatures. The O-rings 16, 20 may be made of a suitable elastomeric material.

The stator O-ring 16 provides a tight seal between the stator 12 and the housing 18. Moreover, the radial compression of the O-ring 16 between the stator 12 and the housing 18 is sufficient to prevent the stator 12 from rotating with respect to the housing 18. The rotor O-ring 20 provides a tight seal between the rotor 14 and the shaft 22, and the compression of the O-ring 20 between the rotor 14 and the shaft 22 is sufficient to make the rotor 14 rotate in unison with the shaft 22.

Although it is preferred to provide the seal device 10 with the O-rings 16, 20, the seal device 10 may be machined to close tolerances and press fit around the shaft 22 within the housing 18. If the stator 12 and rotor 14 are made of a resilient material, such as TEFLON®, and used in an application providing a relatively constant temperature regime, the seal device 10 can be machined to size and press fit, by arbor press or by hammering the device 10 into place.

In operation, the stator O-ring 16 prevents oil from escaping out of the housing 18 around the outside of the stator 12, and the rotor O-ring 20 prevents contaminants from traveling into the housing 18 along the surface of the shaft 22. Oil and contaminants are dynamically prevented from traveling through the interface between the two ring-shaped members 12, 14 as explained in more detail below.

Since the stator 12 does not rotate with respect to the housing 18, the stator O-ring 16 is not subjected to friction. Therefore, the stator O-ring 16 has a long useful life. Similarly, since the rotor 14 does not rotate with respect to the shaft 22, the rotor O-ring 20 is not subjected to friction and has a long useful life.

The stator O-ring 16 is located within an annular recess 24. As illustrated in FIG. 3, the recess 24 may have a rectangular cross section. The rotor O-ring 20 is also located within a rectangular cross sectioned annular recess 26. The purpose of the recesses 24, 26 is to ensure that the O-rings 16, 20 are located in their proper positions when the seal device 10 is installed within the housing 18 to provide a seal around the shaft 22.

Referring to FIG. 2, the rotor 14 has an end portion 78 having an outwardly directed face 79 and an inwardly directed face 82, and a series of alternating annular ridges 54, 56, 58 and annular grooves 60, 62, 64. The grooves 60, 62, 64 are located between the end portion 78 and the ridges 54, 56, 58. Between groove 64 and ridge 56 is a slanted face 70, between groove 62 and ridge 54 is a slanted face 68 and between groove 60 and end portion 78 is a slanted face 66.

The stator 12 further includes a drain pan 76 and an end portion 80 having an outwardly directed face 84. A gap 83 is positioned between faces 82 and 84 of the rotor 14 and stator 12.

In operation, lubricating oil found within the housing 18 may seep through the gap 83 between the faces 82 and 84. Any oil which travels into the grooves 60, 62, 64 will accumulate on the slanted faces 66, 68, 70. The slanted faces 66, 68, 70 will, in conjunction with the centrifugal force caused by the rotation of rotor 14, cause the oil to be slung radially outwardly to the interior surface of the stator 12, where the oil will drain by gravity to the drain pan 76. The oil can then drain by gravity out of the seal device 10 through the gap 83. Thus, the stator 12 and the rotating shaft 22 work together dynamically to prevent the escape of oil through the seal device 10 into the housing 18.

The stator 12 has an inwardly directed shoulder face 40 for contacting an outer wall 42 of the housing 18 (FIG. 3). The shoulder face 40 is used during assembly to properly locate the stator 12 with respect to the housing 18. That is, the stator 12 may be simply pushed into the housing 18 until the shoulder face 40 abuts against the housing wall 42. The shoulder face 40 prevents the stator 12 from moving too far into the housing 18. The shoulder face 40 may be omitted in an alternative embodiment of the invention. Space limitations may prevent the use of the shoulder face 40.

The rotor 14 has an outwardly directed face 72 (FIG. 2) on ridge 58. The stator 12 has an inwardly directed face 74 which is spaced from face 72 by a gap 73. The rotor 14 further has a connecting portion 94, which may be a flange. The connecting portion 94 is deformable. Prior to assembly of the rotor 14 with the stator 12, the connecting portion 94 is in an undeformed state and extends in a direction parallel to the shaft 22.

Figure 4A:
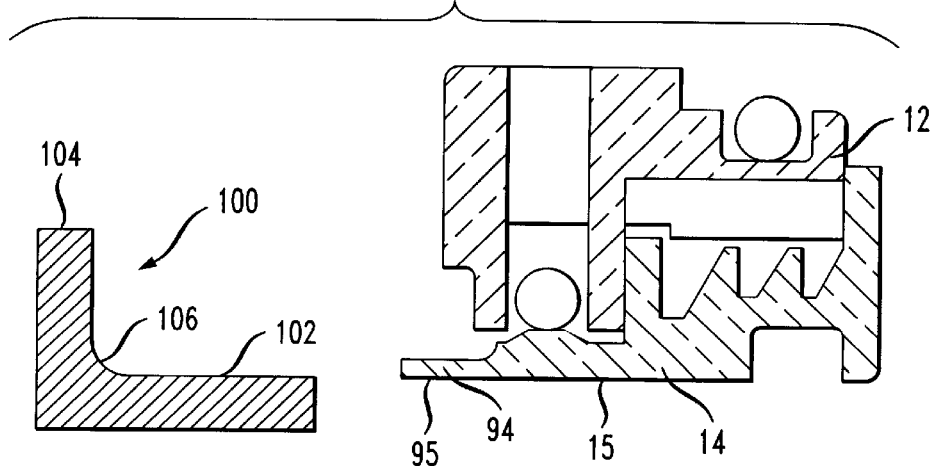
FIGS. 4(a)–4(c) are schematic views showing a method for deforming the connecting portion of the rotor for the seal device of FIG. 1.
Figure 4B:
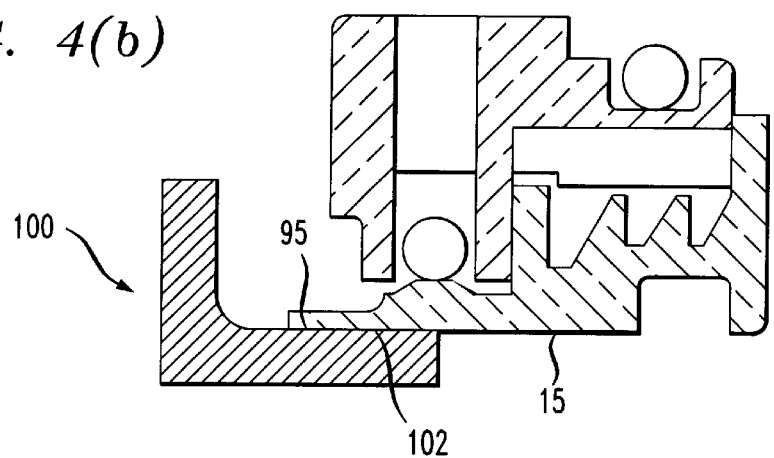
Figure 4C:
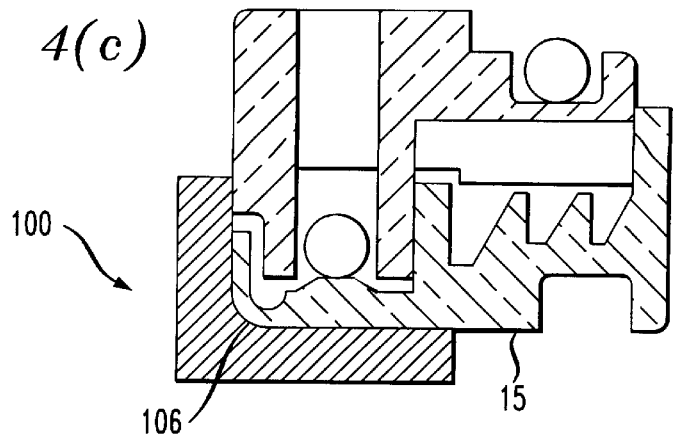
Figure 5:
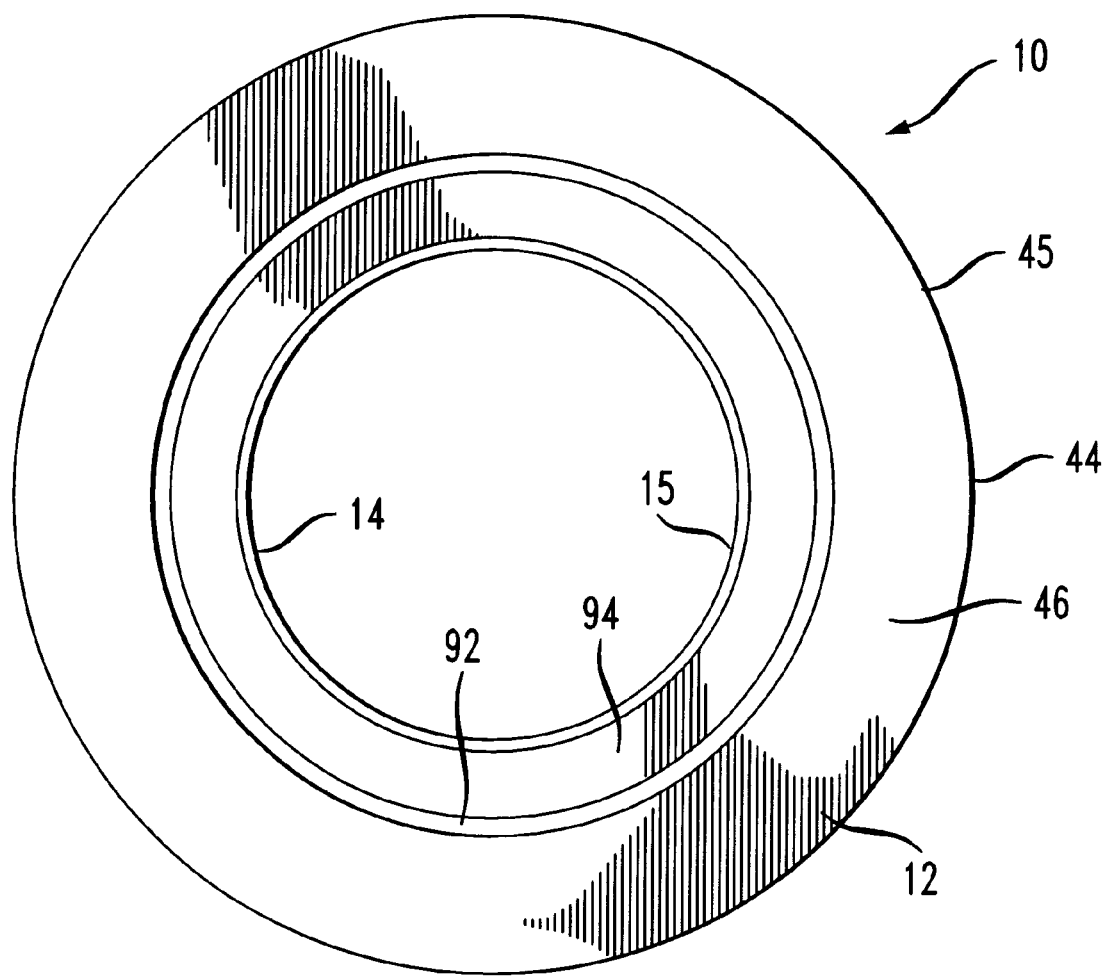
FIG. 5 is a rear elevational view of the seal device of FIG. 1.

The stator 12 also has a ring-shaped cover 44. The cover 44 extends axially outwardly from the shoulder face 40. The cover 44 has a side face 45 and an outwardly directed end face 46 that is coplanar with an outwardly directed end face 95 of the rotor 14 (FIG. 4). The end face 46 further has an annular notch 98. A space 92 exists between connecting portion 94 of rotor 14 and notch 98 of stator 12.

The cover 44 has a radial slot-shaped opening 50 (FIG. 6). The opening 50 is located on the side face 45 at the bottom of the seal device 10. The cover opening 50 is used to direct contaminants out of the seal device 10, as described in more detail below.

In operation, contaminants that find their way into the space 92 between the annular notch 98 of the cover 44 and the connecting portion 94 of the rotor 14 are forced by centrifugal force from the rotation of the rotor 14 about the shaft 22 onto an inner wall 96 of the stator 12. The contaminants then move by gravity though the slot-shaped opening 50.

In another preferred embodiment of the present invention, a slinger, such as an O-ring 86, may be placed within an inner radial passage 97 of the stator 12. The slinger 86 may be felt, Teflon, a spring, or the like. The slinger mount 88 on the rotor 14 is used for seating the slinger 86. The slinger 86 may have a smaller diameter than the diameter of the rotor 14 at the mount 88, and thus during assembly (to be described further below), the slinger 86 is rolled up the inclined face 90 to seat on the mount 88.

As noted above, the stator 12 and the rotor 14 are interconnected together by the connecting portions 94, 98, with a space 92 therebetween. It is advantageous to minimize the space 92 between connecting portions 94, 98. In particular, the total space 92 between the connecting portions 94, 98 should be as small as possible without being equal to zero. When the space 92 is very small, there is very little room for contaminants to move in a radial direction through the space 73 between the outwardly directed face 72 of the rotor 14 and the inwardly directed face 74 of the stator 12. The rotor 14 should fit within the stator 12 with just enough play to ensure that there is substantially no friction between the relatively rotating members 12, 14.

The preferred width of the space 92 is in the range of about 0.001 to about 0.02 inches, with a most preferred length in the range of about 0.001 to about 0.004 inches. The width of the space 92 controls the width of space 73 and gap 83. Alternatively, small spacers (not shown) may be formed on one or both of the faces 72, 74 in order to provide a proper gap width for spaces 73, 92 and gap 83. The spacers would wear off rapidly due to the frictional forces directed upon them by the rotation of the rotor 14 relative to the stator 12.

The width of the space 92 is determined, in some respects, by the applications in which the seal may be used. For example, in applications where the contaminants are predominantly dust particles, or where high pressure spraying of fluids occurs, a smaller space 92 is desirable. In other applications, such as where the shaft rotates slightly off-axis and wobbles, a greater space 92 is desirable.

As noted above, it is preferred that the rotor 14 and the stator 12 be formed of high temperature materials, such as bronze. A seal device with a rotor and stator formed of high temperature materials is able to retain its dynamic sealing capabilities even during high temperature operations, such as during a fire.

To assemble the seal device 10, the stator 12 (including the cover 44) is placed radially outward of the rotor 14. Optionally, the O-ring slinger 86 may be placed within the inner passage 97 of the stator 12 prior to placing the stator 12 outward of the rotor 14. When placing the stator 12 in proper position, the O-ring slinger 86 is pushed up the inclined face 90 (the slinger 86 is pushed by the stator 12) to seat on the mount 88 of the rotor 14. Further, the O-ring 16 is positioned within recess 24.

With reference to FIG. 4, next will be described the forming operation. For a seal device 10 which includes the rotor 14 made of a plastically deformable material, the rotor 14 and the stator 12 are then placed on a shaping tool 100. The tool 100 has an L-shaped cross section and includes a minor diameter 102 and a major diameter 104, with a radius 106 therebetween. The minor diameter 102 is placed inward of the inner wall 15 of the rotor 14 (FIG. 1) against the face 95. As the tool 100 is moved such that the minor diameter 102 extends further down the wall 15 of the rotor 14, the connecting portion 94 begins to be deformed by the force directed upon it at the radius 106. The tool 100 is then pushed in with an arbor press to deform the connecting portion 94 to the required amount of deformation. Some materials may form better if preheated prior to the forming operation. For example, for a rotor 14 made of brass, heating the brass to a temperature of about 1200 to about 1400° F. will prevent cracking from occurring.

Alternatively, the connecting portion 94 of the rotor 14 may be subjected to a roller lathe (not shown) in order to deform the portion 94 such that the outer face 95 becomes coplanar with outwardly directed end face 46 of the stator 12.

The O-ring 20 is then placed within the recess 26, prior to the seal device 10 being positioned around the shaft 22. Finally, the seal device 10 is adjusted to properly seat the seal device 10 against the shaft 22 and the housing 18.

For assembly of a seal device 10 having a rotor 14 made of a non-plastically deformable material, another suitable assembly process may be used.

The above description is intended to be illustrative of preferred embodiments which can achieve the objects, features and advantages of the present invention. It is not intended that the present invention be limited thereto. Any modifications coming within the spirit and scope of the following claims are to be considered part of the present invention.

What is claimed as new and desired to be protected by Letters Patent of the United States is:

1. A non-contact labyrinth seal device, comprising:
   a stator having an opening and a connecting portion; and
   a rotor having a plastically deformable connecting portion and a plurality of rotor slingers, said rotor being rotatable with respect to said stator, said connecting portion of said rotor being located radially inside of said connecting portion of said stator, said connecting portions being arranged to be connected to each other by plastically deforming said deformable connecting portion.

2. The device of claim 1, further comprising a first O-ring for providing a seal between said stator and a housing, and a second O-ring for providing a seal between said rotor and a shaft.

3. The device of claim 2, wherein said rotor further includes an end portion having an inwardly directed face; and
   said stator includes a radially inwardly facing drain pan and an end portion having an outwardly directed face, a gap being positioned between said faces;
   whereby centrifugal force from rotation of said rotor causes fluid located between said rotor and said stator to be slung by said plurality of rotor slingers to said drain pan to drain from said device through said gap.

4. The device of claim 3, wherein said rotor further includes an O-ring mount and a slinger O-ring for guiding contaminants out of said stator opening, said slinger O-ring being positioned on said O-ring mount.

5. The device of claim 4, wherein said rotor further includes a plurality of slanted faces positioned between said plurality of slingers, said slanted faces assisting in guiding fluid toward said drain pan and through said gap.

6. The device of claim 5, wherein said stator and said rotor fit together with a total axial play of no more than approximately four-thousandths of an inch.

7. The device of claim 6, wherein said rotor and said stator are formed of metal.

8. The device of claim 7, wherein said metal includes bronze.

9. The device of claim 5, wherein said deformable connecting portion is a flange.

10. The device of claim 9, wherein the flange extends around an entire circumference of the device.

11. A sealed system having an interconnected, non-contact labyrinth seal device, comprising:
   a housing having an opening;
   a shaft extending through said opening, said shaft being rotatable relative to said housing;
   a stator sealed to said housing, said stator being non-rotatable relative to said housing, said stator having an opening and a connecting portion; and
   a rotor sealed to said shaft, said rotor being non-rotatable relative to said shaft, said rotor having a plurality of rotor slingers and a plastically deformed connecting portion, said connecting portion of said rotor being located radially inside of said connecting portion of said stator, said connecting portions being connected to each other.

12. The system of claim 11, wherein said connecting portion of said stator includes an annular notch, and wherein said connecting portion of said rotor is a flange, said flange being located within said notch.

13. The system of claim 12, wherein a first O-ring provides a seal between said stator and said housing and a second O-ring provides a seal between said rotor and said shaft.

14. The system of claim 13, wherein said rotor includes an end portion having an inwardly directed face; and said stator includes a radially inwardly facing drain pan and an end portion having an outwardly directed face, a gap being positioned between said faces;

whereby centrifugal force from rotation of said rotor causes fluid located between said rotor and said stator to be slung by said plurality of rotor slingers to said drain pan to drain from said device through said gap.

15. The system of claim 14, wherein said rotor further includes an O-ring mount and a slinger O-ring for guiding contaminants out of said stator opening, said slinger O-ring being positioned on said O-ring mount.

16. The system of claim 15, wherein said rotor further includes a plurality of slanted faces positioned between said plurality of slingers, said slanted faces assisting in guiding fluid toward said drain pan and through said gap.

17. The system of claim 16, wherein said rotor and said stator are formed of metal.

18. The system of claim 17, wherein said metal includes bronze.

19. The system of claim 16, wherein said deformed connecting portion is a flange.

20. The system of claim 19, wherein the flange extends around an entire circumference of the seal device.

21. A method of assembling an interconnected, non-contact labyrinth seal device, said method comprising the steps of:

providing a stator having a connecting portion;

providing a rotor having a plastically deformable connecting portion;

positioning said stator radially outward of said rotor;

plastically deforming said deformable connecting portion to interconnect with said stator connecting portion;

adjusting the position of said rotor with respect to said stator such that said stator and said rotor fit together with a total axial play of no more than approximately four-thousandths of an inch;

inserting a slinger O-ring within an inner radial passage of said stator and then positioning said stator such that a portion of said rotor is radially inward of said slinger O-ring.

22. A non-contact labyrinth seal device, comprising:

a stator having an opening and a connecting portion; and a rotor having a plastically deformable connecting portion, said rotor being rotatable with respect to said stator, said connecting portion of said rotor being located radially inside of said connecting portion of said stator, said connecting portions are arranged to be connected to each other by plastically deforming said deformable connecting portion, wherein said rotor further includes a mount and a slinger for guiding contaminants out of said stator opening, said slinger being positioned on said mount.

23. The device of claim 22, wherein said slinger is a spring.

24. The device of claim 22, wherein said slinger is an O-ring.

25. A sealed system having an interconnected, non-contact labyrinth seal device, comprising:

a housing having an opening;

a shaft extending through said opening, said shaft being rotatable relative to said housing;

a stator sealed to said housing, said stator being non-rotatable relative to said housing, said stator having an opening and a connecting portion; and a rotor sealed to said shaft, said rotor being non-rotatable relative to said shaft, said rotor having a plastically deformed connecting portion, said connecting portion of said rotor being located radially inside of said connecting portion of said stator, said connecting portions being connected to each other, wherein said rotor further includes a mount and a slinger for guiding contaminants out of said stator opening, said slinger being positioned on said mount.

26. The system of claim 25, wherein said slinger is a spring.

27. The system of claim 25, wherein said slinger is an O-ring.

* * * * *